(12) United States Patent
O'Dougherty et al.

(10) Patent No.: US 7,370,791 B2
(45) Date of Patent: *May 13, 2008

(54) MANUFACTURING SYSTEM WITH INTRINSICALLY SAFE ELECTRIC INFORMATION STORAGE

(75) Inventors: Kevin T. O'Dougherty, Arden Hills, MN (US); Bryan Baillie, Lindstrom, MN (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/644,380

(22) Filed: Dec. 22, 2006

(65) Prior Publication Data

US 2007/0102507 A1 May 10, 2007

Related U.S. Application Data

(63) Continuation of application No. 10/725,218, filed on Dec. 1, 2003, now Pat. No. 7,152,781.

(51) Int. Cl.
*G06F 7/00* (2006.01)

(52) U.S. Cl. .................. 235/376; 235/375

(58) Field of Classification Search ............... 235/375, 235/376, 435, 451, 487; 340/545.6, 572.8, 340/571, 546.6; 700/156, 123, 131
See application file for complete search history.

(56) References Cited

U.S. PATENT DOCUMENTS

| | | | |
|---|---|---|---|
| 3,527,985 | A | 9/1970 | Brown |
| 5,953,682 | A | 9/1999 | McCarrick et al. |
| 6,271,753 | B1 | 8/2001 | Shukla |
| 6,282,458 | B1 | 8/2001 | Murayama et al. |
| 6,542,848 | B1 | 4/2003 | Neeser et al. |
| 6,751,520 | B2 | 6/2004 | Mathewes et al. |
| 6,879,876 | B2 | 4/2005 | O'Dougherty et al. |
| 7,188,767 | B2 * | 3/2007 | Penuela et al. ............. 235/439 |

\* cited by examiner

*Primary Examiner*—Seung Ho Lee
(74) *Attorney, Agent, or Firm*—Dorsey & Whitney LLP

(57) ABSTRACT

The present invention is a manufacturing system including a hazard zone and a non-hazard zone. The system includes a storage device, located in the hazard zone, for electrically storing information. The system further includes a communication device, also located in the hazard zone, for storing information to and reading information from the storage device. In the non-hazard zone, a controller is in electrical communication with the communication device. The controller controls the system based on information read from the storage device by the communication device. To limit electrical energy passing to the communication device, an intrinsic safety barrier located in the non-hazard zone is connected between the communication device and the controller device.

31 Claims, 3 Drawing Sheets

MANUFACTURING SYSTEM WITH INTRINSICALLY SAFE ELECTRIC INFORMATION STORAGE

CROSS-REFERENCE TO RELATED APPLICATION(S)

This application is a continuation of U.S. patent application Ser. No. 10/725,218, filed on Dec. 1, 2003, and issuing as U.S. Pat. No. 7,152,781 on Dec. 26, 2006, for "Manufacturing System with Intrinsically Safe Electric Information Storage" by Kevin T. O'Dougherty and Bryan Baillie.

BACKGROUND OF THE INVENTION

This invention relates to a storage and dispensing system for the storage and dispensing of liquids. In particular, the invention relates to a radio frequency identification (RFID) antenna including an intrinsic safety barrier for use in a hazardous liquid dispensing environment.

Certain manufacturing processes require the use of liquid chemicals such as acids, solvents, bases, photoresists, dopants, inorganic, organic and biological solutions, pharmaceuticals, and radioactive chemicals. Storage and dispensing systems allow alternative containers to be used to deliver liquid chemicals to a manufacturing process at a specified time.

These containers include an electric storage device attached to the cap of each container which contains information about the chemical stored inside the container. For example, a radio frequency identification (RFID) tag may be attached to the container, the RFID tag including a place for electric information storage such as an electrically erasable programmable read only memory (EEPROM) and a passive radio frequency (RF) transponder. The information on the RFID tag is typically in communication with an RF antenna to, for example, assure that the proper chemical is being used at the proper time and to access other information on the EEPROM. The RF antenna is typically in electrical communication with a computer via an RF card connected to the computer. For a further description of this information storage system, see Pub. U.S. App. 2002/0189667, to O'Dougherty et al., which is herein incorporated by reference.

At times, chemicals used in manufacturing and production environments are volatile, and must be stored in a controlled hazard area. In order to allow the use of certain electrical equipment and apparatus (such as RFID tags and RF antennas), which could potentially cause ignition of the hazardous substances, consideration must be made for safety and protection against this ignition possibility.

One method of preventing an explosion caused by ignition of the hazardous substances is to make the electrical equipment intrinsically safe. The concept of intrinsic safety in electric process control systems is known in the prior art. Intrinsic safety involves limiting the electrical energy at potential sources of ignition in electrical circuits (hot components and spark sources) to such low levels that even under abnormal (fault) conditions there is no possibility of the electrical energy igniting an explosive atmosphere.

In a liquid storage and dispensing system including volatile liquids, the storage containers must be kept in a hazard area. Conventional systems do not allow for electrical communication with the storage containers in the hazard area. A liquid storage and dispensing system with an intrinsically safe electrical communication system would be an improvement over conventional systems.

BRIEF SUMMARY OF THE INVENTION

The present invention is a manufacturing system including a hazard zone and a non-hazard zone. The system includes a storage device, located in the hazard zone, for electrically storing information. The system further includes a communication device, also located in the hazard zone, for storing information to and reading information from the storage device. In the non-hazard zone, a controller is in electrical communication with the communication device. The controller controls the system based on information read from the storage device by the communication device. To limit electrical energy passing to the communication device, an intrinsic safety barrier located in the non-hazard zone is connected between the communication device and the controller device.

For example, the manufacturing system may be a system for filling a container with a hazardous liquid. An electric storage device is coupled with the container for electrically storing information relating to the liquid stored in the container. The system also has a write device for storing information to the electric storage device. The system includes a control unit, coupled with the write device, for controlling dispensing of liquid from a liquid reservoir and controlling writing information to the electric storage device. Finally, an intrinsic safety barrier is connected between the write device and the electric storage device to limit electrical energy entering the hazard zone.

As another example, the manufacturing system may be a system for handling hazardous liquids. The system for handling hazardous liquids includes a container capable of holding a liquid. An electric storage device is coupled with the container for electrically storing information relating to the liquid stored in the container. The system also has an antenna for storing information to and reading information from the electric storage device. The system includes a microprocessor-based controller, coupled with the antenna, for controlling processing of the liquid based on information read from the electric storage device by the antenna. Finally, an intrinsic safety barrier is connected between the antenna and the controller to limit electrical energy entering the hazard zone.

In a preferred embodiment, the intrinsic safety barrier includes a plurality of forward conduction diodes connected in parallel between the controller and ground, typically arranged in a multiple redundancy configuration. The intrinsic safety barrier preferably further includes a fuse connected in series with the plurality of forward conduction diodes to prevent overloading the plurality of forward conduction diodes and to limit the amount of power passed into the hazard zone. A plurality of blocking capacitors may be connected in series with the controller and the antenna to block a DC component of the signal coming from the controller. Further, at least one resistor may be connected in series with the controller and the antenna to suppress transient voltage surges at the antenna.

DETAILED DESCRIPTION

Figure 1:
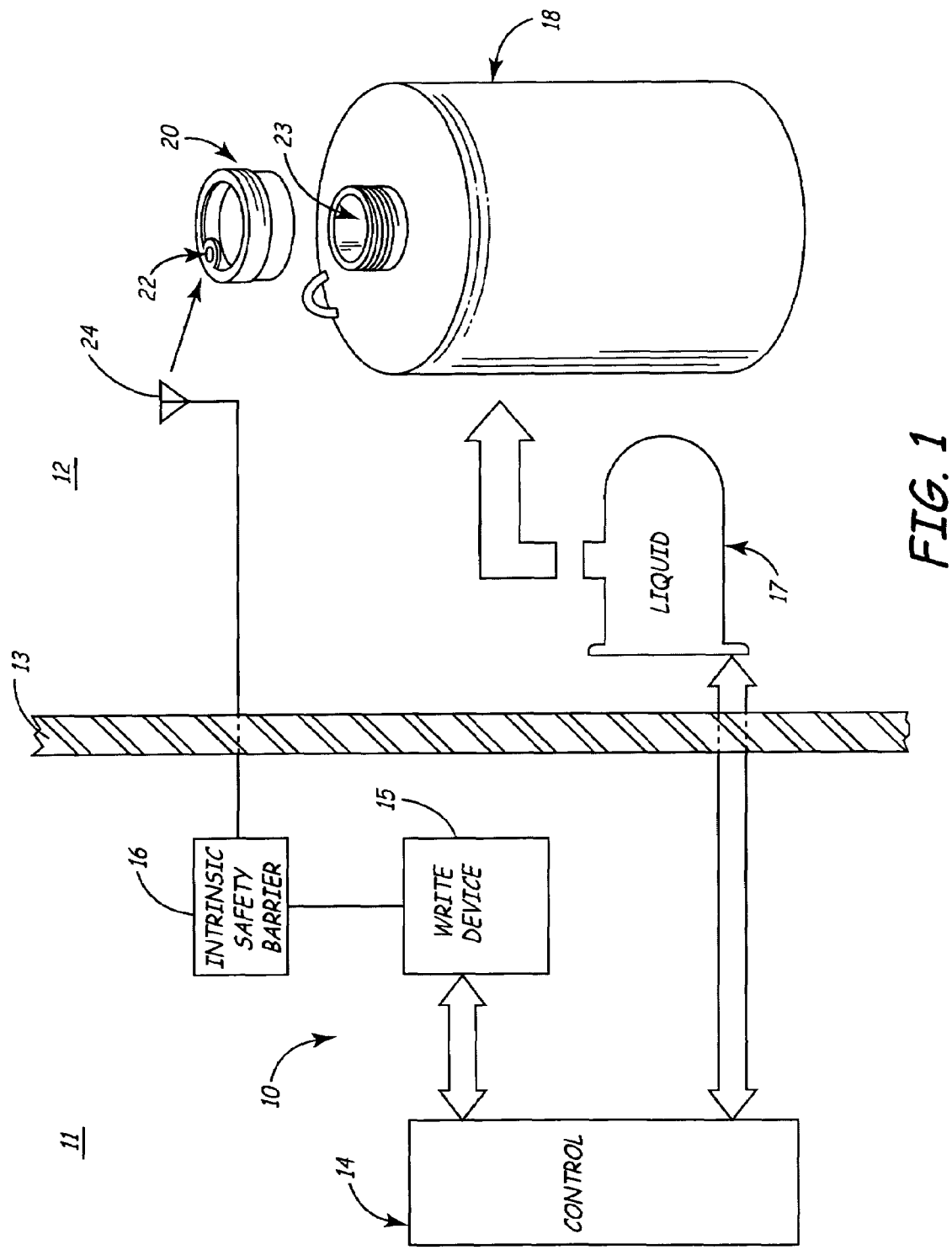
FIG. 1 shows a filling system for filling a container with a volatile or combustible liquid according to the present invention.

FIG. 1 shows filling system 10 for filling a container with a volatile or combustible liquid. Filling system 10 includes non-hazard zone 11 and hazard zone 12 separated by explosion protection wall 13. In non-hazard zone 11, filling system 10 includes microprocessor-based control unit 14, write device 15, and intrinsic safety barrier 16. In hazard zone 12, filling system 10 includes liquid reservoir 17, container 18 and cap 20. Control unit 14 is electrically connected to write device 15 and liquid reservoir 17. Control unit 14 is preferably a microprocessor-based computer system, and write device 15 is preferably a radio frequency (RF) card connected to the microprocessor-based computer system. Liquid reservoir 17 is in fluid communication with container 18. Cap 20 includes radio frequency identification (RFID) tag 22. RFID tag 22 includes an electrically-erasable programmable read-only memory (EEPROM) and a passive RF transponder. Write device 15 is capable of writing to RFID tag 22 on cap 20 via RF antenna 24. Intrinsic safety barrier 16 (described in detail below) is connected between write device 15 and RF antenna 24.

In operation of filling system 10, control unit 14 regulates dispensing of liquid from liquid reservoir 17 into container 18. Typically, filling system 10 includes a plurality of liquid reservoirs 17 connected to control unit 14. That is, control unit 14 typically regulates dispensing of a plurality of liquids into a plurality of containers 18. The liquids dispensed from liquid reservoir 17 are typically dispensed for use in a manufacturing process, and may include acids; solvents; bases; photoresists; dopants; inorganic, organic, and biological solutions; pharmaceuticals; and radioactive chemicals. For ease of illustration, a single liquid reservoir 17 and a single container 18 are shown.

To begin operation of filling system 10, control unit 14 sends a signal to liquid reservoir 17 instructing liquid reservoir 17 to begin dispensing liquid into container 18. Liquid reservoir 17 continues dispensing liquid into container 18 until container 18 is filled to an appropriate level. After container 18 is filled, liquid reservoir 17 (or a sensor electrically associated with liquid reservoir 17 and container 18) sends a signal to control unit 14 indicating container 18 is full. Control unit 14 then sends a signal to liquid reservoir 17 to stop dispensing liquid into container 18. Preferably, the connection between control unit 14 and liquid reservoir 17 (or the sensor electrically associated with liquid reservoir 17 and container 18) is designed to be intrinsically safe.

After container 18 is filled, control unit 14 sends a signal to write device 15. This signal contains information about liquid contained in liquid reservoir 17. Write device 15 subsequently programs the EEPROM contained in RFID tag 22 with information received from control unit 14. Write device 15 communicates with RFID tag 22 on cap 20 via RF antenna 24 using RF transmissions. In particular, RF antenna 24 and RFID tag 22 are electromagnetically coupled when in close proximity, generating power in RFID tag 22 for programming and data storage. Information programmed to RFID tag 22 includes, for example, the type of liquid dispensed into container 18 from liquid reservoir 17, the producer of the liquid contained in liquid reservoir 17, the date of filling of container 18 with liquid from liquid reservoir 17, the date of expiration of the liquid contained in container 18, and similar useful information. Once container 18 has been filled and RFID tag 22 has been programmed by write device 15, cap 20 is secured onto container opening 23 of container 18. It should be noted that RFID tag 22 may be alternatively programmed by write device 15 after cap 20 is secured onto container opening 23.

In a preferred embodiment, cap 20 is threadably connected to container opening 23 of container 18. Cap 20 may also be secured onto container opening 23 by, for example, snapping cap 20 onto container opening 23 or vacuum sealing cap 20 onto container opening 23. The method of securing cap 20 onto container opening 23 depends on the properties of the liquid contained in container 18. After cap 20 has been secured onto container 18, container 18 is transported to a processing system.

As indicated above, the liquid dispensed from liquid reservoir 17 to container 18 in filling system 10 is a volatile or explosive liquid. As the liquid is dispensed from liquid reservoir 17, a vaporous environment of volatile or explosive liquids may be produced. The vaporous environment is capable of producing an explosive or ignitable atmosphere. This necessitates storing liquid reservoir 17 and container 18 (typically along with other liquid reservoirs and containers) in controlled hazard zone 12 behind explosion protection wall 13. Furthermore, in order to allow the use of RFID tag 22 in hazard zone 12, consideration must be made for safety and protection against the possibility of ignition, since this electrical equipment could potentially cause ignition of the hazardous substances. In particular, consideration must be given to limiting electrical energy at potential sources of ignition in electrical circuits (such as control unit 14 and write device 15) to such low levels that even under abnormal (fault) conditions there is no possibility of the electrical energy igniting an explosive atmosphere in hazard zone 12.

To limit electrical energy flowing from control unit 14 and write device 15 in non-hazard zone 11 to RF antenna 24 and RFID tag 22 in hazard zone 12, intrinsic safety barrier 16 is connected between write device 15 and RFID tag 22. Intrinsic safety barrier 16 is typically mounted in a package capable of being attached to a mounting rail, such as a DIN (Deutsches Institut fur Normung e.V.) rail, to facilitate mounting of multiple intrinsic safety barriers relative to write device 15 and for simple access to the electrical connection points of intrinsic safety barrier 16. Intrinsic safety barrier 16 is connected to write device 15 and RF antenna 24 with transmission lines. The transmission line connected to RF antenna 24 is electrically shielded such that it is intrinsically safe and passes through explosion protection wall 13 via a hole sufficiently sealed around the transmission line to maintain the protection provided by explosion protection wall 13. The architecture of intrinsic safety barrier 16 is described in more detail below with regard to FIG. 3.

Figure 2:
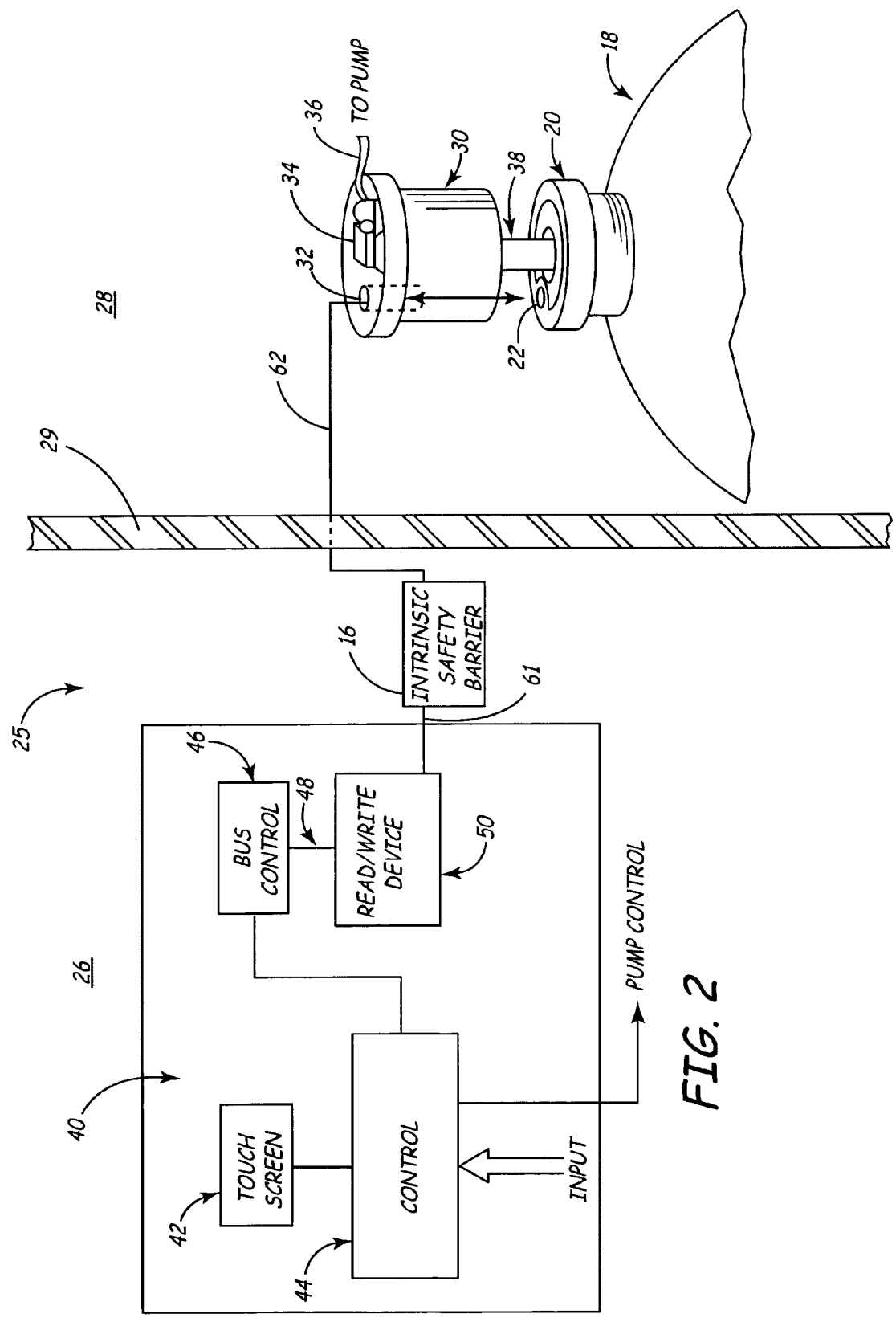
FIG. 2 shows a system according to the present invention for storing, dispensing and processing volatile or combustible liquids.

FIG. 2 shows system 25 according to the present invention for storing, dispensing and processing volatile or combustible liquids. System 25 includes non-hazard zone 26 and hazard zone 28. Non-hazard zone 26 and hazard zone 28 are separated by explosion protection wall 29.

System 25 includes container 18 for storing the volatile or combustible liquids located in hazard zone 28. The liquids stored in container 18 are typically dispensed for use in a manufacturing process. Container 18 typically is filled with liquid at a filling facility, such as filling system 10 shown in FIG. 1. Cap 20 is secured on the top of container 18 at the time of filling and remains on container 18 through transportation and during dispensing of liquid in hazard zone 14. Cap 20 has RFID tag 22 attached to it, which is programmed with information about the liquid in container 18.

When container 18 is situated in hazard zone 28, connector 30 is coupled to cap 20 and container 18. Connector 30 includes RF antenna 32, port adaptor 34, adaptor tube 36, and probe 38. Adaptor tube 36 is connected to port adaptor 34 and to a pump (not shown). Connector 30 is configured to be interconnected with cap 20. To interconnect connector 30 with cap 20, probe 38 is inserted into container 18 through cap 20. Continued pressure on connector 30 allows connector 30 to be moved immediately adjacent cap 20. Probe 38 is then in communication with the interior of container 18. Adaptor tube 36 and port adaptor 34 provide a liquid passage from the interior of container 18 (via probe 38) to the pump. When connector 30 is properly connected to cap 20 and container 18, the pump is capable of pumping the liquid in container 18 through port adaptor 34 and adaptor tube 36 to a manufacturing process, such as the fabrication of integrated circuits.

In order to control dispensing and processing of the liquid in container 18, user-interface 40 is provided in non-hazard zone 26. User interface 40 includes touch screen 42, microprocessor-based control unit 44, bus control unit 46, communication bus 48, and read/write device 50. Touch screen 42 is connected to control unit 44. Control unit 44 is connected to bus control unit 46, typically via an Ethernet cable or other serial communications cable. Control unit 44 also receives input from the manufacturing process. Bus control unit 46 is connected to read/write device 50 via communication bus 48. Touch screen 42, control unit 44, bus control 46, and communication bus 48 are preferably incorporated in a microprocessor-based computer system, and read/write device 50 is preferably a RF card connected to the microprocessor-based computer system. Intrinsic safety barrier 16 (described in detail below) is also placed in non-hazard area 26, and is connected between read/write device 50 and RF antenna 32. Transmission line 61 is connected between read/write device 50 and intrinsic safety barrier 16, and transmission line 62 is connected between intrinsic safety barrier 16 and RF antenna 32. Transmission line 62 supplies power to RF antenna 32 via the RF transmissions from read/write device 50. In system 25 connected as shown in FIG. 2, connector 30 communicates with RFID tag 22 on cap 20 via RF antenna 32 using radio frequency transmissions. In particular, RF antenna 32 and RFID tag 22 are electromagnetically coupled when in close proximity, generating power in RFID tag 22 for programming, data storage, and data retrieval.

For simplicity of illustration, FIG. 2 shows a single connector 30 connected to communication bus 48 through read/write device 50. In a typical system, a plurality of read/write devices 50 are connected to communication bus 48, each read/write device 50 connected to different connectors 30 coupled with containers 18 containing different liquids. Containers 18 are typically situated in a plurality of drawers. Each drawer contains a plurality of positions, with each position configured to hold one container 18. In operation of user-interface 40, each of containers 18 is graphically displayed on touch screen 42 in its corresponding drawer and position within the drawer. For example, in a system having two drawers and four positions within each drawer, container 18 positioned in the second position of the first drawer is graphically displayed on touch screen 42 in the second position of the first drawer. When connector 30 is matched properly with container 18 (as described above), the graphic representation of container 18 on touch screen 42 is displayed in a first color, typically green. This indicates to an operator that the liquid contained in container 18 is ready for dispensing to a process and, upon operator initiation, control unit 44 sends a signal to the pump to begin dispensing (via the connection labeled PUMP CONTROL). Conversely, if connector 30 is matched improperly with container 18 (as described above), the graphic representation of container 18 on touch screen 42 is displayed in a second color, typically red, and a warning message appears on touch screen 42. This indicates to the operator that the liquid contained in container 18 will not dispense to a process until the mismatch is corrected.

When container 18 needs to be replaced (for example, when container 18 is empty), the operator removes container 18 from its position. Touch screen 42 then graphically displays container 18, along with the drawer number and position number of container 18. The operator then exchanges container 18 for a new container, and couples connector 30 with the new container. If connector 30 is matched properly with the new container, all containers are displayed on touch screen 42 in the first color. If connector 30 is matched improperly with the new container, the new container is displayed on touch screen 42 in the second color and a warning message appears on touch screen 42.

Touch screen 42 also allows the operator to choose from a variety of operations using RFID tag 22. Each operation is selectable from a button on touch screen 42 which corresponds to each operation. For example, an operator may view information stored on RFID tag 22 about liquid contained in container 18, record information to RFID tag 22 about liquid in container 18 (such as when the liquid is installed into its proper drawer and position, the shelf life of the liquid, what process the liquid is used in, when the liquid is used in a process, how much of the liquid is used in a process, etc.), or enable probe 38 for dispensing liquid from containers 18. The operator touches the button on touch screen 42 corresponding to a desired operation. Touch screen 42 sends the selection made by the operator to control unit 44. Control unit 44 subsequently commands bus control unit 46 to perform the selected operation. The selected operation is performed, and the result is displayed on touch screen 42.

As an example, the operator may desire to view information stored on RFID tag 22 about liquid in container 18. The operator first pushes the button on touch screen 42 corresponding to this operation. Touch screen 42 sends this selection to control unit 44. Control unit 44 then commands bus control unit 46 to access RFID tag 22 on container 18. To access RFID tag 22, bus control unit 46 sends a signal along communication bus 48 to the read/write device accessing RFID tag 22. In FIG. 1, communication bus 48 sends a signal to read/write device 50. Read/write device 50 then accesses RF antenna 32 via transmission line 62. Next, RF antenna 32 transmits a signal to RFID tag 22. The signal is received by the passive RF transponder contained in RFID tag 22. The signal activates RFID tag 22 and the requested information is accessed from the EEPROM contained on RFID tag 22. The requested information is then read from the EEPROM by the transponder, and the transponder transmits the information back to RF antenna 32 in the form of a RF signal. RF antenna 32 then sends the RF signal containing information to read/write device 50 via transmission line 62. The information is converted to digital signals and sent along communication bus 48 to bus control unit 46, which in turn sends the information to control unit 44. Once received by control unit 44, information about the liquid in container 18 is displayed on touch screen 42.

As indicated above, the liquids stored in container 18 in system 25 are volatile or explosive liquids. As the liquid is dispensed from container 18, a vaporous environment of volatile or explosive liquids may be produced. The vaporous environment is capable of producing an explosive or ignitable atmosphere. This necessitates storing container 18

(typically along with other containers) in controlled hazard zone 28 behind explosion protection wall 29. Furthermore, in order to allow the use of RFID tag 22 and RF antenna 32 in hazard zone 28, consideration must be made for safety and protection against the possibility of ignition, since this electrical equipment could potentially cause ignition of the hazardous substances. In particular, consideration must be given to limiting electrical energy at potential sources of ignition in electrical circuits (such as user-interface 40 components control unit 44, bus control 46, and read/write device 50) to such low levels that even under abnormal (fault) conditions there is no possibility of the electrical energy igniting an explosive atmosphere in hazard zone 28.

To limit electrical energy flowing from user-interface 40 in non-hazard zone 26 to RF antenna 32 in hazard zone 28, intrinsic safety barrier 16 is connected between user-interface 40 and RF antenna 32. Intrinsic safety barrier 16 is preferably attached to read/write device 50 external to user-interface 40. Intrinsic safety barrier 16 is typically mounted in a package capable of being attached to a mounting rail, such as a DIN rail, to facilitate mounting of multiple intrinsic safety barriers relative to user-interface 40 and for simple access to the electrical connection points of intrinsic safety barrier 16. Intrinsic safety barrier 16 is connected to read/write device 50 with transmission line 61 and to RF antenna 32 with transmission line 62. Transmission line 62, which is electrically shielded such that it is intrinsically safe, passes through explosion protection wall 16 via a hole sufficiently sealed around transmission line 62 to maintain the protection provided by explosion protection wall 16.

Figure 3:
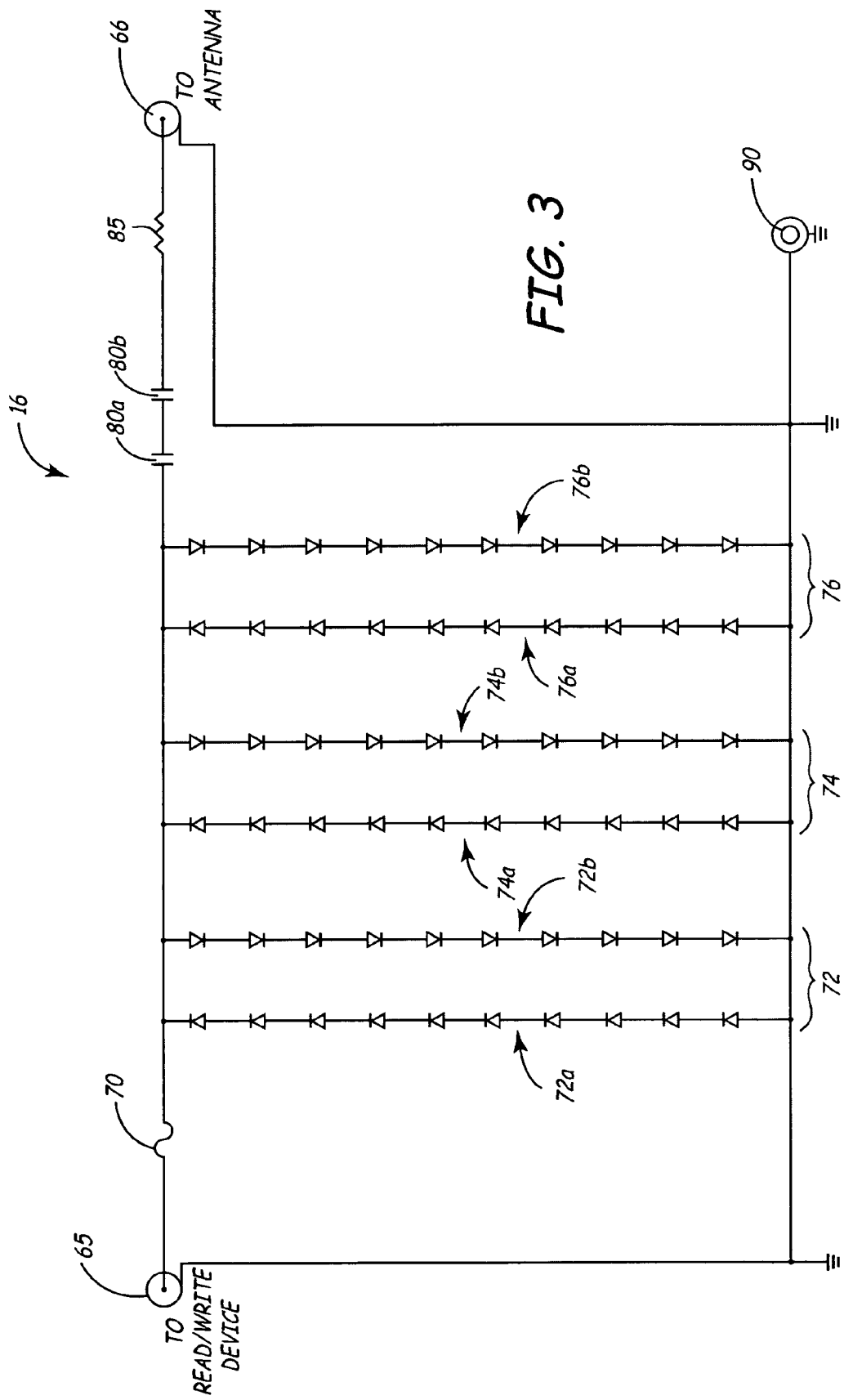
FIG. 3 shows a schematic view of an intrinsic safety barrier according to the present invention.

FIG. 3 shows a schematic view of an intrinsic safety barrier 16 according to the present invention. Intrinsic safety barrier 16 is connected between write device 15 and RF antenna 24 in filling system 10, and between read/write device 50 and RF antenna 32 in liquid handling system 25. For ease of explanation of intrinsic safety barrier 16 in FIG. 3, write device 15 and read/write device 50 will be collectively referred to as an "RF card," and RF antenna 24 and RF antenna 32 will be collectively referred to as an "RF antenna." Intrinsic safety barrier 16 includes transmission line connector 65 in electrical communication with the RF card, and transmission line connector 66 to connect with the RF antenna. Intrinsic safety barrier 16 also includes fuse 70, banks of diodes 72, 74, and 76, DC blocking capacitors 80a and 80b, resistor 85, and ground lug 90. Ground lug 90 is attached to an appropriate ground point, and transmission line connector 65, transmission line connector 66, and banks of diodes 72, 74, and 76 are connected to ground lug 90.

Fuse 70 is connected in series with banks of diodes 72, 74, and 76. Fuse 70 is provided to prevent overloading of diodes 72, 74, and 76, which would result in failure of the diodes. Fuse 70 typically allows a continuous flow of current of 1.7 times its rated breaking current and preferably has a rated breaking current of 0.35 A. Furthermore, in order to quickly limit the amount of power passed into the hazard zone (hazard zone 12 in FIG. 1 and hazard zone 28 in FIG. 2) in the event of a fault, fuse 70 is a fast-acting type fuse.

Banks of diodes 72, 74, and 76 are connected in parallel with respect to each other, and provide a shunt-diode safety barrier for intrinsic safety barrier 16. The diodes in banks of diodes 72, 74, and 76 are preferably forward conduction diodes. Banks of diodes 72, 74, and 76 are redundant such that any fault current is split between them and such that failure of one bank of diodes does not fault out the other two banks of diodes. Also, banks of diodes 72, 74, and 76 are infallibly connected such that they cannot be simultaneously disconnected upon failure of one of the bank of diodes. It should be noted that further redundancy may be provided by adding additional banks of diodes.

The diodes in banks of diodes 72, 74, and 76 are preferably forward conduction diodes with a built-in potential of 0.6 V. During operation of filling system 10 or liquid handling system 25, the signal which propagates between the RF card and the RF antenna along the transmission line is typically a 13.56 MHz signal with a peak-to-peak voltage of less than 5.0 V. In each bank of diodes 72, 74, and 76, a first set of ten diodes (72a, 74a, 76a) is arranged in series in one direction which is forward biased when the AC signal voltage is less than 0.0 V. Conversely, a second set of ten diodes (72b, 74b, 76b) is arranged in series in the opposite direction which is forward biased when the AC signal voltage is greater than 0.0 V. The two sets of ten diodes in each bank of diodes 72, 74, and 76 are arranged in parallel with respect to each other.

Under normal operating conditions, the low energy signal from the RF card is allowed to pass through the transmission line to the RF antenna with little voltage drop and very little attenuation. However, if an abnormal (fault) condition develops in the electrical equipment in non-hazard zone 11 or 26 (e.g., a power surge), banks of diodes 72, 74, and 76 change their transfer characteristic and restrict the energy transferred to hazard zone 12 or 28 to a safe level. In particular, by connecting a series of ten forward conduction diodes between the RF card and ground lug 90, a voltage spike below −6.0 V at the RF card causes negative fault protection diode strings 72a, 74a, and 76a to turn on and split the fault current between them (since each of the diodes have a built-in potential of 0.6 V). Similarly, upon the occurrence of a voltage spike above +6.0 V at the RF card, positive fault protection diode strings 72b, 74b, and 76b turn on and split the fault current between them. This fault voltage cutoff point is acceptably high to not interfere with normal operation of systems 10 or 25, but low enough to prevent excessive power from passing into hazard zone 12 or 28. When banks of diodes 72, 74, and 76 turn on, the fault current is diverted such that it does not pass through to the RF antenna in hazard zone 12 or 28. This prevents the potential overheating of the electrical components in hazard zone 12 or 28, thereby preventing an explosive condition in hazard zone 12 or 28.

DC blocking capacitors 80a and 80b are included to provide galvanic isolation for direct current between the RF card and the RF antenna. DC blocking capacitors 80a and 80b are arranged in a redundant configuration (in series) to provide additional protection against DC surges. Furthermore, DC blocking capacitors 80a and 80b are infallibly spaced apart (i.e., cannot be faulted out of the circuit) and the connecting trace between them is adequately sized such that faulting of one of DC blocking capacitors 80a and 80b does not affect the performance of the other. DC blocking capacitors 80a and 80b are rated to withstand twice the voltage required to fault them out of the circuit, plus 1600 VAC. DC blocking capacitors 80a and 80b both preferably have capacitances of 0.1 mF at 25 V.

Resistor 85 is connected in series between DC blocking capacitor 80b and the RF antenna. Resistor 85 is provided to suppress transient voltage surges at the RF antenna. Resistor 85 is infallibly spaced apart (i.e., cannot be faulted out of the circuit) from DC blocking capacitor 80b. Preferably, resistor 85 has a resistance of 3.3 W with a power rating of 2.0 Watts.

In summary, the present invention is a system for filling or handling liquid in a hazard zone. The system has a container capable of holding a liquid. An electric storage device is coupled with the container for electrically storing information relating to the liquid stored in the container. The system also has an antenna, for storing information to and reading information from the electric storage device. The system has a microprocessor-based controller, coupled with the antenna, for controlling processing of the liquid based on information read from the electric storage device by the antenna. An intrinsic safety barrier is connected between the antenna and the controller to limit electrical energy entering the hazard zone. In a preferred embodiment, the intrinsic safety barrier includes a plurality of forward conduction diodes connected in parallel between the controller and ground, typically arranged in multiple redundancy configuration. The intrinsic safety barrier preferably further includes a fuse connected in series with the plurality of forward conduction diodes to prevent overloading the plurality of forward conduction diodes. A plurality of blocking capacitors may be connected in series with the controller and the antenna to block a DC component of the signal coming from the controller. Further, at least one resistor may be connected in series with the controller and the antenna to suppress transient voltage surges at the antenna.

Although the present invention has been described with reference to preferred embodiments, workers skilled in the art will recognize that changes may be made in form and detail without departing from the spirit and scope of the invention.

The invention claimed is:

1. A filling system for use in a location with a hazard zone and a non-hazard zone, the system comprising:
   communication means, located in the hazard zone, for storing information to and reading information from storage means, located in the hazard zone, for electrically storing information;
   controller means, located in the non-hazard zone and in electrical communication with the communication means, for controlling the system based on information read from the storage means by the communication means; and
   an intrinsic safety barrier located in the non-hazard zone and connected between the communication means and the controller means to limit electrical energy passing to the communication means.

2. The filling system of claim 1, wherein the storage means comprises a radio frequency identification (RFID) tag.

3. The filling system of claim 2, wherein the RFID tag comprises a passive radio frequency (RF) transponder and an electrically erasable programmable read-only memory (EEPROM), the EEPROM storing the information.

4. The filling system of claim 1, wherein the communication means includes a RF antenna.

5. The filling system of claim 1, further comprising write means, located in the non-hazard zone, for writing the information and transmitting the information to the communication means.

6. The filling system of claim 5, wherein the write means includes an RF card, the communication means includes a RF antenna, and the RF card is in electrical communication with the RF antenna via an intrinsically safe transmission line.

7. A system for handling liquid in a container disposed in a hazard zone, the system comprising:
   a cap adapted to be coupled to the container and having a radio frequency identification (RFID) tag mounted thereon;
   a radio frequency (RF) antenna which is capable of storing information to and reading information from the RFID tag;
   a controller coupled with the RF antenna to control processing of the liquid from the container based on information read from the RFID tag by the RF antenna; and
   an intrinsic safety barrier connected between the RF antenna and the controller.

8. The system of claim 7, wherein the intrinsic safety barrier includes a plurality of forward conduction diodes connected in parallel between the controller and ground.

9. The system of claim 8, wherein the plurality of forward conduction diodes are arranged in a multiple redundancy configuration to prevent failure of the intrinsic safety barrier.

10. The system of claim 8, wherein the intrinsic safety barrier further includes a fuse connected in series with the plurality of forward conduction diodes to prevent overloading the plurality of forward conduction diodes and to limit electrical energy passing to the antenna.

11. The system of claim 8, wherein the intrinsic safety barrier further includes a plurality of DC blocking capacitors connected in series with the controller and the RF antenna.

12. The system of claim 8, wherein the intrinsic safety barrier further includes at least one resistor connected in series with the controller and the RF antenna to suppress transient voltage surges at the RF antenna.

13. The system of claim 7, wherein the RFID tag comprises a passive RF transponder and an electrically erasable programmable read-only memory (EEPROM).

14. The system of claim 13, wherein the EEPROM stores information about the liquid contained in the container.

15. The system of claim 7, wherein the controller comprises a user-interface capable of receiving input from a user.

16. The system of claim 15, wherein the controller means further controls processing the liquid based on input received by the user-interface from the user.

17. An intrinsically safe data retrieval system comprising:
   a radio frequency identification (RFID) tag containing information to be retrieved, the RFID located in a hazard zone;
   a radio frequency (RF) antenna electromagnetically coupled to the RFID tag, the RF antenna located in the hazard zone;
   a communication device adapted for communicating with the RF antenna, the communication device located outside the hazard zone; and
   an intrinsic safety barrier located outside the hazard zone and connected between the RF antenna and the communication device.

18. The intrinsically safe data retrieval system of claim 17, wherein the RFID tag comprises a passive RF transponder and an electrically erasable programmable read-only memory (EEPROM).

19. The intrinsically safe data retrieval system of claim 17, wherein the communication device communicates with the RF antenna via a transmission line.

20. The intrinsically safe data retrieval system of claim 17, wherein the RFID tag and the RF antenna are powered through the transmission line.

21. A manufacturing system including a hazard zone and a non-hazard zone, the system comprising:
   a communication device, located in the hazard zone, for storing information to and reading information from an electrical storage device located in the hazard zone;
   a controller, located in the non-hazard zone and in electrical communication with the communication device, for controlling the system based on information read from the storage device by the communication device; and an intrinsic safety barrier located in the non-hazard zone and connected between the communication device and the controller to limit electrical energy passing to the communication device.

22. The manufacturing system of claim 21, wherein the intrinsic safety barrier includes a plurality of forward conduction diodes connected in parallel between the controller means and ground.

23. The manufacturing system of claim 22, wherein the plurality of forward conduction diodes are arranged in a multiple redundancy configuration.

24. The manufacturing system of claim 22, wherein the intrinsic safety barrier further includes a fuse connected in series with the plurality of forward conduction diodes to prevent overloading the plurality of forward conduction diodes and to limit electrical energy passing into the hazard zone.

25. The manufacturing system of claim 22, wherein the intrinsic safety barrier further includes a plurality of DC blocking capacitors connected in series with the controller means and the communication means.

26. The manufacturing system of claim 22, wherein the intrinsic safety barrier further includes at least one resistor connected in series with the controller means and the communication means to suppress transient voltage surges at the communication means.

27. The manufacturing system of claim 21, wherein the storage device comprises a radio frequency identification (RFID) tag.

28. The manufacturing system of claim 27, wherein the RFID tag comprises a passive radio frequency (RF) transponder and an electrically erasable programmable read-only memory (EEPROM), the EEPROM storing the information.

29. The manufacturing system of claim 21, wherein the communication means includes a RF antenna.

30. The manufacturing system of claim 29, wherein the controller means includes a computer having an RF card, the RF card in electrical communication with the RF antenna.

31. The manufacturing system of claim 30, wherein the RF card is in electrical communication with the RF antenna via an intrinsically safe transmission line.

* * * * *